United States Patent [19]

Sakamoto

[11] Patent Number: 4,498,959
[45] Date of Patent: Feb. 12, 1985

[54] COOLING ATTACHMENT FOR SOLAR DISTILLER

[76] Inventor: Minoru Sakamoto, 3911 Nioi Place, Honolulu, Hi. 96816

[21] Appl. No.: 363,821

[22] Filed: Mar. 31, 1982

Related U.S. Application Data

[63] Continuation-in-part of Ser. No. 94,918, Nov. 19, 1979, abandoned.

[51] Int. Cl.³ ............................................... B01D 3/02
[52] U.S. Cl. ............................ 202/185.2 A; 202/234; 202/236
[58] Field of Search ............ 202/234, 236, 185, 185.2; 203/DIG. 1; 73/171

[56] References Cited

U.S. PATENT DOCUMENTS

| | | | |
|---|---|---|---|
| 2,683,333 | 7/1954 | Canicoba | 202/185 |
| 3,870,605 | 3/1975 | Sakamoto | 202/234 |
| 4,331,514 | 3/1982 | Bauer | 202/185.2 |

Primary Examiner—Frank Sever
Attorney, Agent, or Firm—Harvey B. Jacobson

[57] ABSTRACT

The upwardly converging dome enclosing an evaporation chamber above a body of liquid is provided with an attachment for removal of vapor to enhance evaporation and condensation within the dome. Cooling conduits of the attachment conduct gas and vapor from the upper apex of the dome through passages having vented enlargements from which regulated escape of gas and vapor occurs.

9 Claims, 6 Drawing Figures

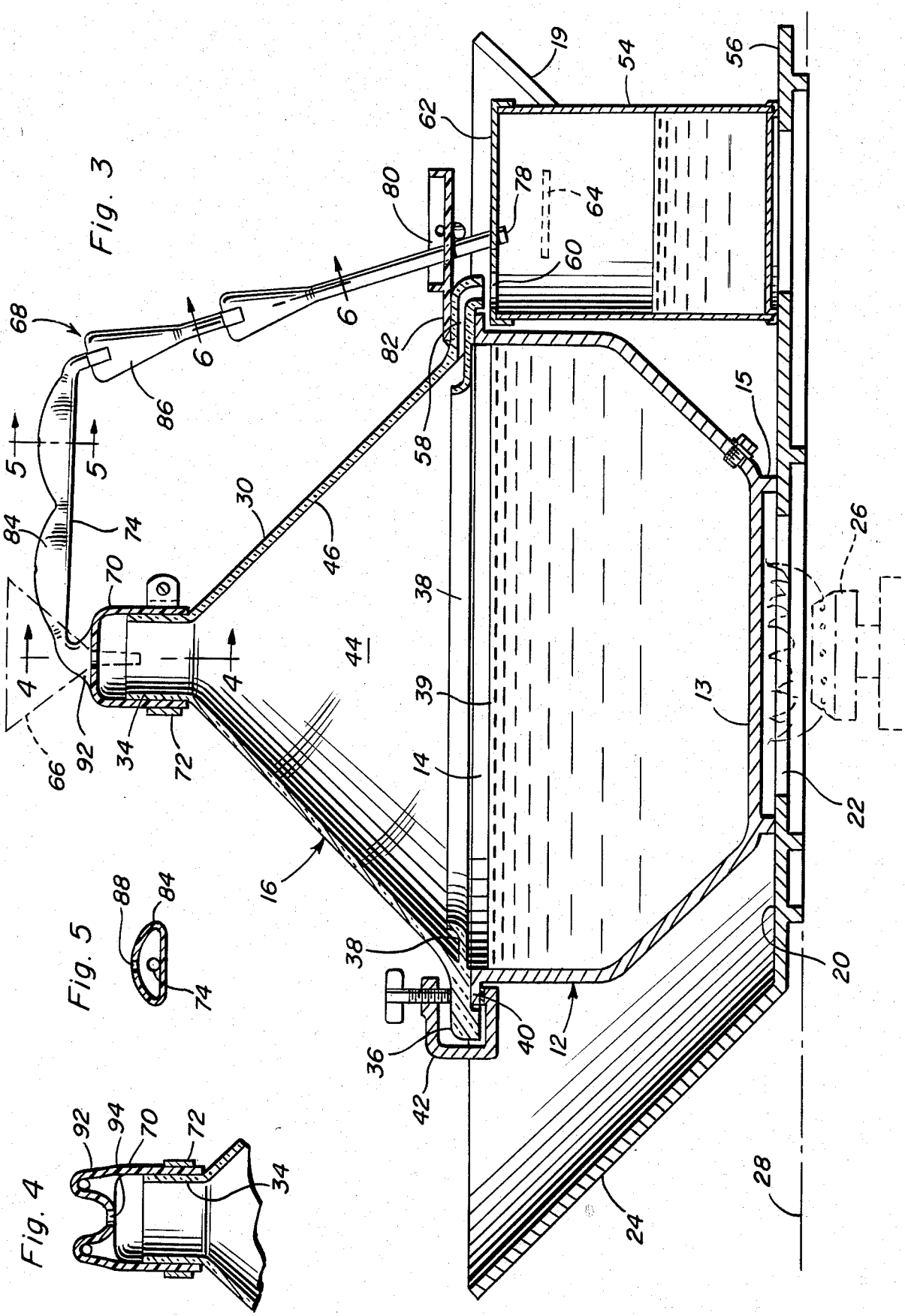

COOLING ATTACHMENT FOR SOLAR DISTILLER

The present application discloses an invention which relates to an attachment for a solar distiller and rain catcher of the type disclosed in my prior U.S. Pat. No. 3,870,605, and is a continuation-in-part of my prior copending application, Ser. No. 94,918, filed Nov. 19, 1979, now abandoned.

BACKGROUND OF THE DISCLOSURE

Apparatus of the type disclosed in my prior U.S. patent utilized heat obtained from solar radiation or other sources to effect evaporation of a body of water into a chamber internally of an upwardly converging dome removably secured to an open pot within which the body of water is stored. The water vapor in the dome enclosed chamber condenses on the inner surface of the dome and is collected within a trough at the lower edge of the dome to not only supply distillate to a receiver vessel but to dehumidify the chamber by removal of the distillate in order to maintain the evaporation process continuous. The upper apex portion of the dome is closed by a removable plug to seal the chamber while the apparatus is in operation as a distiller and to permit the charging of the apparatus with water through the upper apex by insertion of a funnel as well as to enable use of the apparatus as a rain catcher by inverting the dome. During use of the apparatus as a distiller, the rate of evaporation is rather low at times because of low temperature differentials and the low rate at which condensate is collected to dehumidify the evaporation chamber.

The removal of steam or water vapor through a conduit from the top of a dome-like container in a distilling apparatus is already well known as disclosed in U.S. Pat. No. 698,958 to Jester. The dome-like container or kettle disclosed in the Jester patent, does not, however, have internal condensate collecting means from which condensate is withdrawn independently of the top of the kettle and does not even suggest formation of condensate within the kettle.

U.S. Pat. No. 3,417,000 to Chaconas discloses a distilling apparatus wherein vapor condensing tubes are formed with spherical enlargements for the express purpose of increasing the heat transfer surface area of such conduits through which all of the vapor is conducted from the evaporation chamber. Such an arrangement in a distilling apparatus is substantially different from the type disclosed in my prior U.S. patent wherein primary condensation occurs within the dome enclosing the evaporation chamber directly above the body of liquid from which vapor evolves.

It is an important object of the present invention to improve operation of the apparatus disclosed in my prior U.S. patent aforementioned as a distiller, without adversely affecting its rain catching and water charging capabilities.

An additional object in accordance with the foregoing object is to enhance evaporation within the dome of the apparatus disclosed in my prior U.S. patent.

SUMMARY OF THE INVENTION

In accordance with the present invention, a cooling attachment is releasably secured to the upper apex portion of the dome associated with a distilling apparatus of the type disclosed in my prior U.S. patent aforementioned. The cooling attachment is operative to effect secondary condensation of water vapor and discharge it into the same condensate receiver into which condensate primarily collected within the dome is discharged. The cooling attachment includes two thermally nonconductive conduits connected to the upper apex of the dome for removal of the vapor. The conduits include downwardly inclined portions having lower ends extending into the condensate receiver vessel and are formed with longitudinally spaced enlargements to promote condensation. Restricted gas venting outlets are formed in the enlargements to permit regulated escape of gas and vapor. The downward incline of the conduit portions is maintained by supports extending therefrom into engagement with the lower rim portion of the dome.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side sectional view taken substantially through a plane indicated by section line 3—3 in FIG. 1.

FIG. 4 is a partial sectional view taken substantially through a plane indicated by section line 4—4 in FIG. 3.

FIG. 5 is a transverse sectional view taken substantially through a plane indicated by section line 5—5 in FIG. 3.

DETAILED DESCRIPTION OF PREFERRED EMBODIMENT

Figure 1:
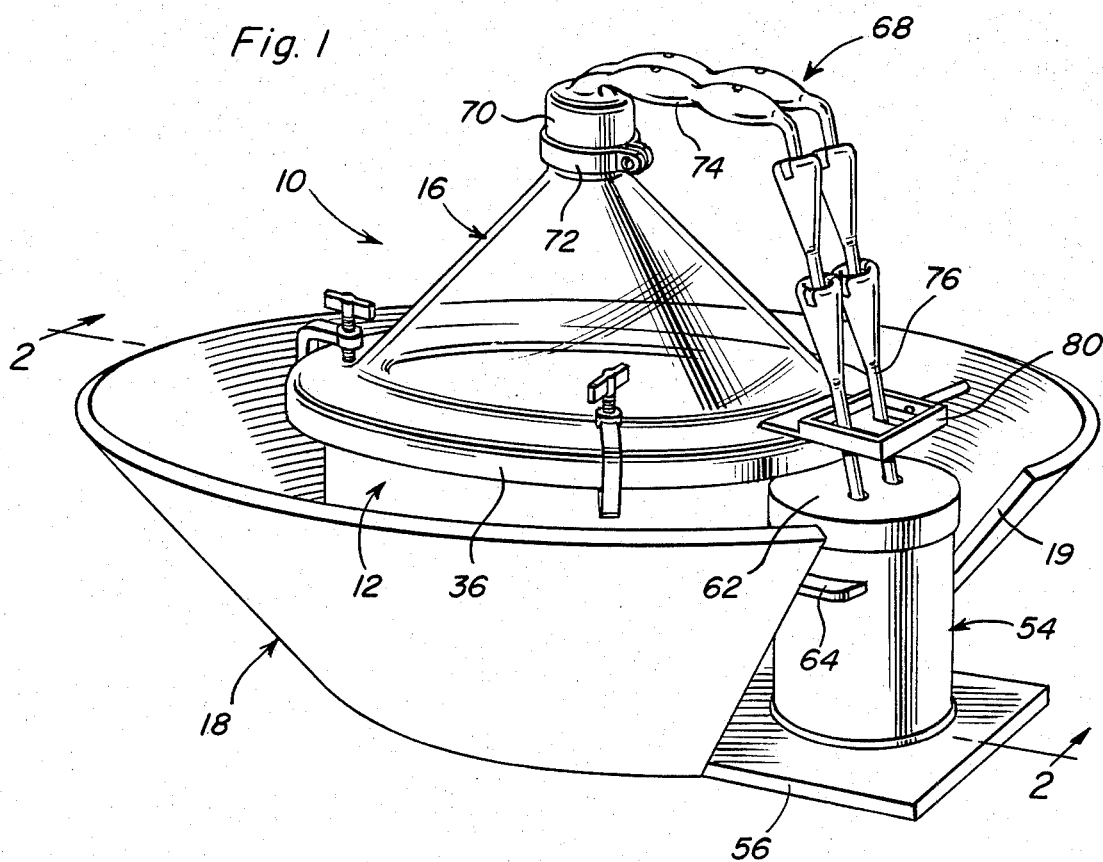
FIG. 1 is a perspective view of an apparatus in a distilling mode of operation with the cooling attachment of the present invention installed.
Figure 2:
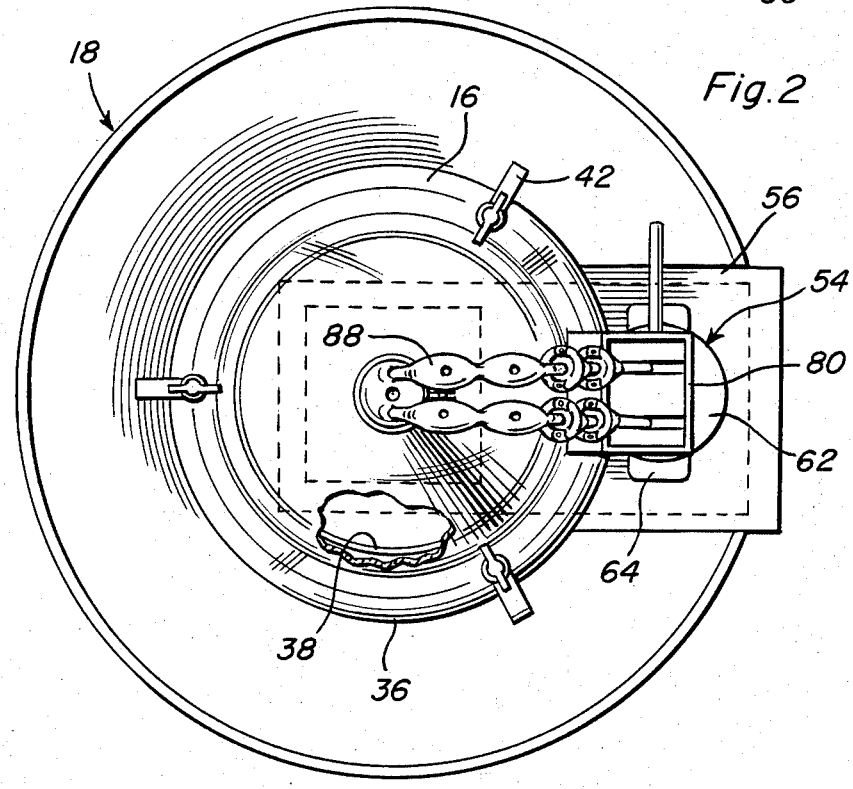
FIG. 2 is a top plan view of the apparatus shown in FIG. 1.

Referring now to the drawings in detail, FIGS. 1 and 2 illustrate a distillation apparatus generally referred to by reference numeral 10. The apparatus 10 is of the type disclosed in my prior U.S. Pat. No. 3,870,605 in that it includes a pot or container generally referred to by reference numeral 12 seated within a base generally referred to by reference numeral 18. The pot 12 has an upwardly converging dome or cover 16 secured thereto from which a condensate or distillate is discharged into a condensate receiver vessel 54. The pot 12 has a bottom portion 13, as more clearly seen in FIG. 3, supported by spacer legs 15 on a planar bottom portion 20 of the base 18. The base has an upwardly diverging conical wall portion 24 which surrounds the pot 12 except for a gap 19. The receiver vessel 54 is supported within the gap 19 on an extension 56 of the planar bottom portion 20 of the base. Both the base 18 and the pot 12 are made of a heat conductive material such as cast iron with both the inner and outer surfaces of the pot having a heat absorbing property by being colored preferably black. The inner surface of the base 18 is also heat absorbing or black in color while the external surface is colored white so as to endow it with a heat reflective property. The base rests on a suitable support 28 and is provided with an opening 22 through which heat is transmitted to the pot 12 from a suitable source, such as a burner 26 shown by dotted line in FIG. 3. The dome 16 is made of a transparent material such as tempered glass and includes a cone portion 30 which extends between a lower rim portion 36 and an upper apex neck portion 34. The upper end of the pot 12 forms an enlarged opening 14 which exposes a body of water 37 stored within the pot up to a maximum water level 39 as shown in FIG. 3, closely spaced below a condensate collecting trough or gutter 38 on the lower rim portion 36 of the dome 16. The rim portion 36 of the dome is releasably secured to an annular flange 40 at the upper end of the pot 12 by means of a plurality of C-clamps 42.

As described in my prior patent aforementioned, the water 37 in its liquid state within the pot evaporates from its upper surface 39 as a result of heat applied thereto from either a burner 26 or by solar radiation entering the dome 16. The dome when secured in place as shown in FIGS. 1-3, encloses an evaporation chamber 44 above the body of water 37 while the internal surface 46 of its conical portion 30 forms a condensation surface from which water condensate flows downwardly under the urge of gravity into the condensate collecting trough 38. Extending radially outward from the trough 36 through the rim portion 36 of the dome in alignment with the gap 19, is a condensate outlet passage 58. The outlet passage will accordingly discharge condensate collected in the trough into the receiver vessel 54 through an opening 60 formed in a removable cover 62 on the receiver vessel. The receiver vessel is removably positioned on the extension 56 by means of the handles 64. Water may be charged into the pot 12 through the upper apex portion 34 by use of a funnel 66 shown by dotted line in FIG. 3.

As is well known in the art, a distilling apparatus of the foregoing type will be operative in response to heat supplied to the body of water 37 causing evaporation within chamber 44. Vapor evolving from the water is primarily condensed on surface 46 of the dome and the condensate removed from the chamber 44 through outlet passage 58 to decrease the humidity in the evaporation chamber in order to sustain continued evaporation. In order to enhance evaporation in accordance with the present invention, any vapor reaching the upper apex portion 34 of the dome is removed by means of a cooling attachment generally referred to by reference numeral 68. The evaporation chamber is thereby further dehumidified and the temperature therein is reduced.

The cooling attachment 68 includes an outlet connector 70 which is adapted to fit over the apex neck portion 34 of the dome. The connector 70 is held in sealing engagement with the apex portion 34 by means of a removable clamp 72. A pair of vapor outlet conduit portions 74 extend laterally from the connector 70 at a slight downward slope so as to conduct water vapor to the upper ends of downwardly inclined conduit portions 76 of the cooling attachment. The lower ends 78 of the portions 74 and 76 of the colling conduits project into the receiver vessel 54 through openings in the cover 62. The lower end portions of the cooling conduits extend through an overflow trough 80 which also form a support arranged to contact the annular rim portion 36 of the dome when the cooling attachment is installed as shown in FIGS. 1, 2 and 3. The support thereby positively maintains the downward incline of the cooling conduit portions 76.

Figure 6:
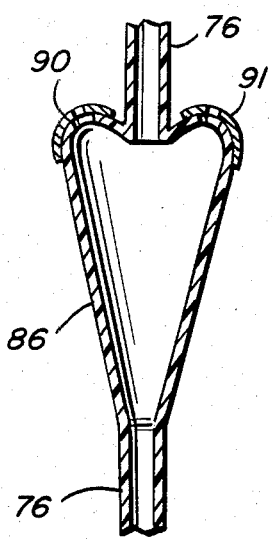
FIG. 6 is a section view taken substantially through a plane indicated by section line 6—6 in FIG. 1.

The cooling attachment is made of an insulative or thermally nonconductive material such as plastic or glass. In order to enhance cooling and condensation, the conduit portions 74 and 76 are respectively provided with longitudinally spaced enlargements 84 and 86. At the vertically uppermost points of the enlargements, restricted gas venting openings 88 and 90 are formed as more clearly seen in FIGS. 5 and 6. The enlargements volumetrically extend the conduit portions in directions generally transverse to the flow path. Accordingly, any vapor descending through the conduit portions will undergo intermittent expansion to momentarily and abruptly accelerate the flow stream causing separation of relatively non-condensible gas and vapor phases of the flow stream that escapes through the vent openings 88 and 90. The vent openings may be adjusted in size by use of tape 91 with holes therein as shown in FIG. 6.

As more clearly seen in FIGS. 3 and 4, the vapor outlet conduit portions 74 are connected to the outlet connector 70 by means of upwardly converging transition portions 92 between which an opening 94 is formed for receiving the stem of the funnel 66, aforementioned, in order to accommodate charging of the pot with water to be distilled.

It will be apparent from the foregoing description that the cooling action effected by attachment 68 arises from the removal of heat with the vapor and gas leaving the upper apex portion of the dome. Some of this heat escapes to atmosphere with the non-condensible gas and vapor trapped above the flow stream under the vent openings 88 and 90. The volumetric expansion of the fluid passing through the enlarged portions 84 and 86 of the conduits will cause momentary acceleration of the flow stream to effect inertial separation of the non-condensible phases of the flow stream and thereby enhance secondary condensation of the more dense phases and as well as to regulate the escape of vapor and gas through the vent openings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a distillation device having a heat conductive container storing a body of a liquid therein, an enclosure converging upwardly to an outlet and forming a chamber above the body of liquid therein into which the liquid evaporates and means for condensing vapor within said chamber, the improvement comprising means designed, sized and arranged for both increasing condensation capacity and regulating venting, including conduit means adapted to be connected to the outlet of the enclosure, vent means formed in the conduit means at spaced locations for escape of non-condensibles therefrom, and means for regulating said escape of non-condensibles during flow of the vapor and gas through the conduit means.

2. The attachment as defined in claim 1 wherein said regulating means is constituted by transverse passage enlargements of the conduit means within which the vent means is located.

3. In combination with distillation apparatus, means designed, sized and arranged for both increasing condensation capacity and regulating venting comprising an elongated conduit having two series-connected sections disposed in obtuse angular relation to each other, one of said sections having a vapor inlet end and the other of the sections having a condensate outlet end, means for attaching the vapor inlet end to the distillation apparatus, each of said conduit sections conducting fluid between the inlet and outlet ends along a common flow path and provided with spaced enlargements extending transversely of said common flow path within which sequential volumetric expansion and contraction of fluid occurs during flow, each of said enlargements being provided with a vent opening through which non-condensibles may escape during said volumetric expansion.

4. The attachment as defined in claim 3 wherein the enlargements associated with the other of the conduit sections are conical shaped, converging from a large diameter end portion in the direction of flow along said common flow path, the vent openings in the conical shaped enlargements being located at the large diameter end portions.

5. The attachment as defined in claim 4 including adjustable orifice means for varying the size of said vent openings.

6. The attachment as defined in claim 3 including adjustable orifice means for varying the size of said vent openings.

7. In combination with a distillation apparatus, means designed, sized and arranged for both increasing condensation capacity and regulating venting, including an elongated conduit section through which a common flow path is established, means for attaching the conduit section to the distillation apparatus, a plurality of enlargements formed in the conduit section spaced along said flow path, and vent means spaced transversely of said common flow path for venting non-condensibles from each of the enlargements of the conduit section.

8. The attachment as defined in claim 7 wherein each of said enlargements converges from a large diameter end portion in the direction of flow along said common flow path, the vent means including orifice openings formed in the large diameter end portions of the enlargements.

9. The condensing attachment as defined in claim 7 wherein the common flow path is substantially horizontal, said enlargements having peak portions vertically spaced above the common flow path at which the vent means is located.

* * * * *